United States Patent
Rosenberg (10) Patent No.: US 8,106,360 B2
(45) Date of Patent: Jan. 31, 2012

(54) MICROSCOPIC INFRARED ANALYSIS BY X-RAY OR ELECTRON RADIATION

(75) Inventor: Richard A. Rosenberg, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 62 days.

(21) Appl. No.: 12/789,823

(22) Filed: May 28, 2010

(65) Prior Publication Data

US 2010/0320388 A1  Dec. 23, 2010

Related U.S. Application Data

(60) Provisional application No. 61/219,018, filed on Jun. 22, 2009.

(51) Int. Cl.
*G01J 5/02* (2006.01)
(52) U.S. Cl. .................................. 250/339.08
(58) Field of Classification Search .............. 250/339.08
See application file for complete search history.

(56) References Cited

U.S. PATENT DOCUMENTS

| | | | | |
|---|---|---|---|---|
| 5,274,435 | A * | 12/1993 | Hettrick | 356/328 |
| 6,072,853 | A * | 6/2000 | Hall | 378/73 |
| 7,255,835 | B2 * | 8/2007 | Franzen et al. | 422/82.11 |

FOREIGN PATENT DOCUMENTS

JP  2006220467 A  *  8/2006

OTHER PUBLICATIONS

K. Masutani, H. Sugisawa, A. Yokota, Y. Furukawa, and M. Tasumi, "Asynchronous Time-Resolved Fourier Transform Infrared Spectroscopy" Appl. Spectrosc. 46, 560 1992.

J. Ralston, H. Ennen, P. Wennekers, P. Hiesinger, N. Herres, J. Schneider, H. Müller, W. Rothemund, F. Fuchs, J. Schmälzlin, and K. Thonke, J., "Structural, Electrical and Optical Characterization of Single-Crystal ErAs Layers Grown on GaAs by MBE" Electron. Mater. 19, 555 1990.

A. Cvitkovic, N. Ocelic, J. Aizpurua, R. Guckenberger, and R. Hillenbrand, "Infrared Imaging of Single Nanoparticles via Strong Field Enhancement in a Scanning Nanogap" Phys. Rev. Lett. 97, 060801 2006.

K. Tochigi, H. Momose, Y. Misawa, and T. Suzuki, "Polarization-Modulation Emission FT-IR Measurement of Thin Organic Films on Metal Surfaces" Appl. Spectrosc. 46, 156 1992.

B. G. Yacobi and D. B. Holt, "Cathodoluminescence scanning electron microscopy of semiconductors" J. Appl. Phys. 59, R1 1986.

(Continued)

*Primary Examiner* — David Porta
*Assistant Examiner* — Christine Sung
(74) *Attorney, Agent, or Firm* — Joan Pennington (57) ABSTRACT

An infrared (IR) emission spectroscopy and microscopy apparatus with X-ray excitation or electron excitation and an improved process for extending spatial relation of infrared (IR) microscopy and performing microscopic infrared (IR) analysis by X-ray or electron radiation are provided. By utilizing nanometer sized X-ray beams or electron beams to produce IR emission, the spatial resolution of IR microscopy is extended. Simultaneously performing X-ray or electron-based spectroscopy as well as structural studies are enabled.

19 Claims, 5 Drawing Sheets

OTHER PUBLICATIONS

T. Masaki, Y. Inouye, and S. Kawata, "Submicron resolution infrared microscopy by use of a near-field scanning optical microscope with an apertured cantilever" Rev. Sci. Instrum. 75, 3284 2004.

S. P. Watkins, C. A. Tran, R. Ares, and G. Soerensen, "High mobility InAs grown on GaAs substrates using tertiarybutylarsine and trimethylindium" Appl. Phys. Lett. 66, 882 1995.

M. Brehm, T. Taubner, R. Hillenbrand, and F. Keilmann, "Infrared Spectroscopic Mapping of Single Nanoparticles and Viruses at Nanoscale Resolution" Nano Lett. 6, 1307 2006.

F. H. Scholes, A. Locatelli, H. Kleine, V. P. Ostanin, and D. A. King, "Low frequency infrared emission spectroscopy of molecules at single crystal surfaces" Surf. Sci. 502, 249 2002.

Y. Lacroix, S. P. Watkins, C. A. Tran, and M. L. W. Thewalt, "Sharp exictonic photoluminescence from epitaxial InAs" Appl. Phys. Lett. 66, 1101 1995.

S. Chiang, R. G. Tobin, P. L. Richards, and P. A. Thiel, "Molecule-Substrate Vibration of CO on Ni(100) Studied by Infrared-Emission Spectroscopy" Phys. Rev. Lett. 52, 648 1984.

* cited by examiner

MICROSCOPIC INFRARED ANALYSIS BY X-RAY OR ELECTRON RADIATION

This application claims the benefit of U.S. Provisional Application No. 61/219,018 filed on Jun. 22, 2009.

CONTRACTUAL ORIGIN OF THE INVENTION

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

The present invention relates to an improved process and apparatus for extending spatial relation of infrared (IR) microscopy, for example, by orders of magnitude, and performing X-ray spectroscopy and structural studies, and performing microscopic infrared (IR) analysis by X-ray radiation or electron radiation.

DESCRIPTION OF THE RELATED ART

A known method for studying the vibrational properties of matter is Fourier transform infrared (FTIR) spectroscopy. Synchrotron radiation (SR) based X-ray scattering, diffraction and absorption techniques are typically used to understand structural, electronic and magnetic properties of materials. Electrons can be focused to very small spots, for example, <1 nm, and can be used for microscopy as well as elemental mapping using X-ray fluorescence and/or Auger electron spectroscopy.

The ability to perform these techniques on the same samples at the same time would be a significant advantage. Furthermore, the spatial resolution of conventional FTIR microscopes is limited by diffraction, which in the mid-infrared is 2-20 μm. Currently the state of the art in SR science is being performed at third generation sources such as the Advanced Photon Source (APS) at Argonne National Laboratory, Argonne, Ill. 60439, U.S.A., and the Advanced Light Source, Berkeley Lab, Berkeley, Calif. 94720, U.S.A. X-ray microscopes at such facilities will be capable of <30 nm diameter X-ray beams. Next generation free electron laser based SR sources will extend the resolution to the 1-10 nm regime, while sub nm sized electron beams are currently available.

There are no known arrangements for providing infrared emission spectroscopy following X-ray excitation and current studies using electrons have been limited to the near infrared regime.

Recently there have been reports of sub-diffraction limited infrared imaging using near-field techniques. These methods require smooth, well-prepared surfaces and any complementary electron or X-ray analysis must be done separately.

A principal object of the present invention is to provide an improved process for extending spatial relation of infrared (IR) microscopy by orders of magnitude, and at the same time performing X-ray spectroscopy and structural studies.

SUMMARY OF THE INVENTION

In brief, an infrared (IR) emission spectroscopy and microscopy apparatus with X-ray excitation or electron excitation and an improved process for extending spatial relation of infrared (IR) microscopy, and performing microscopic infrared (IR) analysis by X-ray or electron radiation are provided.

An X-ray beam source produces X-rays that are dispersed by a monochromator, focused by focusing optics, and irradiate a sample. The sample is mounted on a manipulator, and is isolated from ground, enabling a sample current or total electron yield (TEY) to be monitored. A Fourier transform infrared (FTIR) system and objective lens is provided for collecting IR radiation. An IR radiation detector is provided with the FTIR system.

In accordance with features of the invention, an electron beam source is used for providing a small spot electron beam, replacing the small spot X-ray beam. The FTIR detector and objective lens are provided with a scanning electron microscope (SEM) system. Images are obtained by scanning the electron beam, and simultaneously monitoring peak intensities or areas from the corresponding FTIR spectra. These images are correlated with corresponding SEM images to identify the material properties of the sample.

In accordance with features of the invention, by utilizing nanometer sized X-ray beams or electron beams to produce IR emission, the spatial resolution of IR microscopy is extended by orders of magnitude.

In accordance with features of the invention, simultaneously performing X-ray or electron-based spectroscopy as well as structural studies are enabled. The manipulator supporting the sample includes heating and cooling capabilities enabling temperature dependent studies.

In accordance with features of the invention, a monochromatic x-ray flux irradiating the sample is provided in a range of approximately $10^{11}$ to $10^{15}$ photons/second in an energy range of approximately 300-30000 eV (electron Volts).

In accordance with features of the invention, fiber optics may be optionally used to collect IR radiation. The IR radiation detector includes a mercury cadmium telluride (MCT) detector cooled with liquid nitrogen or other suitable detector.

In accordance with features of the invention, the special periodic magnetic array called an undulator in a APS storage ring produces intense, quasi-monochromatic, for example, approximately 5%, beams of X-rays.

In accordance with features of the invention, in addition to optics to extract the IR radiation, a microchannel plate (MCP) detector is provided for detecting total X-ray fluorescence (XRF) or optionally a energy dispersive Si or Ge diode detector may be used to detect element-specific x-ray fluorescence.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, Using focused beams in accordance with features of the invention, it is possible to perform sub-diffraction limited IR imaging. In addition, simultaneous structural and electronic analysis advantageously is performed using the X-ray or electron excitation probes.

Figure 1:
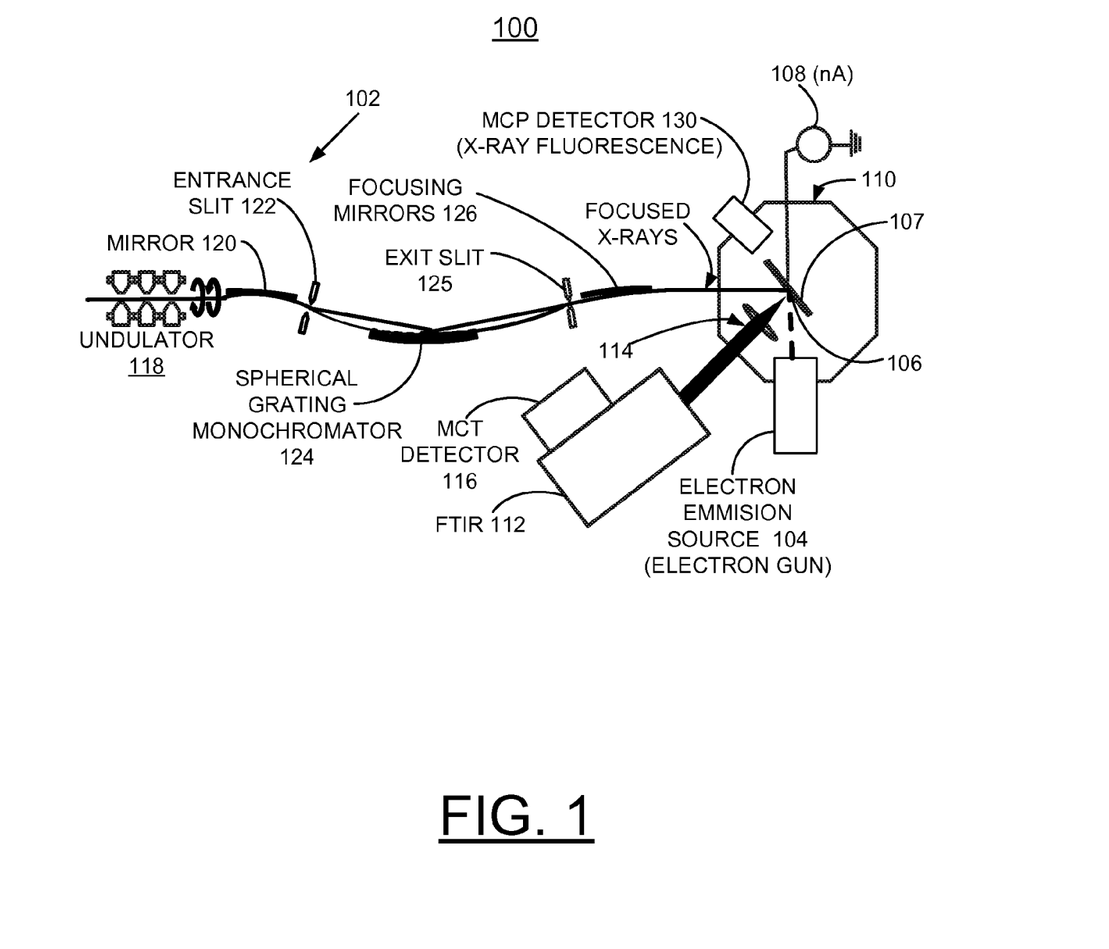
FIG. 1 is a schematic and block diagram representation of exemplary infrared (IR) emission spectroscopy apparatus following X-ray excitation or electron excitation shown in dotted line for implementing an improved process for extending spatial relation of infrared (IR) microscopy, and performing microscopic infrared (IR) analysis by X-ray or electron radiation.

Having reference now to the drawings, in FIG. 1 there is shown an exemplary infrared (IR) emission spectroscopy apparatus generally designated by reference character 100 for implementing an improved process for extending spatial relation of infrared (IR) microscopy, and performing microscopic infrared (IR) analysis by X-ray or electron radiation. IR emission spectroscopy apparatus 100 includes an X-ray excitation source 102 providing a small spot X-ray beam or electron excitation source 104 providing a small spot electron beam shown in dotted line.

IR emission spectroscopy apparatus 100 includes a sample 106 mounted on a manipulator 107, and a current amplifier 108 is coupled between ground potential and the sample and manipulator 107. The sample 106 is isolated from ground, enabling a sample current or total electron yield (TEY) to be monitored. The manipulator 107 supporting the sample 106 is mounted within an available ultra-high vacuum end station 110 on an insertion device beamline at the APS. The manipulator 107 includes heating and cooling capabilities enabling temperature dependent studies. The ultra-high vacuum end station 110 or experimental chamber is shown schematically in FIG. 1.

A significant advantage of the invention is that a high-energy X-ray beam line could also be utilized which would enable measurements to be performed in air or some other environment, such as water, high pressure cell, rather than vacuum.

A Fourier transform infrared (FTIR) system 112, such as a commercial FTIR system, manufactured and sold by Newport Corp. of Irvine, Calif., USA, is incorporated into the end station 110 and an objective lens 114 is provided for collecting IR radiation. An IR radiation detector 116 is provided with the FTIR system 114.

A special periodic magnetic array 118 called an undulator, located in the APS storage ring, produces intense, quasi-monochromatic (~5%) beams of X-rays. The X-rays coupled by a mirror 120 through an entrance slit 122 are dispersed by a spherical grating monochromator 124, located in beamline 4-ID-C, focused by one or more focusing mirrors 126 to a size of <0.2 mm and then irradiate the sample 106 which is mounted on the manipulator 107, such as a precision XYZΘ manipulator 107. The monochromatic flux irradiating the sample 106 is on the order of, for example, $10^{11}$ to $10^{15}$ photons/sec in the energy range 500-30000 eV.

In addition to the optics 114 used to extract the IR radiation, the end station also houses a microchannel plate (MCP) detector 130 to detect the total X-ray fluorescence (XRF). Optionally, detector 130 includes an energy dispersive Si or Ge diode detector that may be used to detect element-specific X-ray fluorescence. The sample 106 is normally isolated from ground enabling the sample current, or total electron yield (TEY) to be monitored. XRF and TEY are often used to obtain X-ray absorption near edge spectroscopy (XANES) data, providing valuable information.

The electron emission source 104 is implemented, for example, with a commercially available electron gun that produces 1-5 kV electrons. Due to geometrical constraints, the electron gun 104 in a prototype apparatus had to be positioned several inches from its optimum focus resulting in a fairly large (~1 cm) spot. For the measurements presented here the electron gun 104 was operated at 4 kV, 1.8 mA emission, resulting in a measured sample current of 26 microamps.

The objective lens 114 collecting the IR emission, for example, includes a $CaF_2$ objective lens and collected IR radiation transmitted through a $CaF_2$ viewport to the entrance of the interferometer. Also, objective lens 114 collecting the IR emission, for example, includes a KBr objective lens collecting IR radiation and collected IR radiation transmitted through a KBr viewport to the entrance of the interferometer. The IR radiation is detected by a liquid-nitrogen cooled, mercury-cadmium-telluride (MCT) detector 116. A personal computer (not shown) is used to collect the interferogram and process the data.

An experimental approach was used to measure the bandgap excitation luminescence from InAs thin films whose FTIR spectrum had been obtained previously using laser excitation. InAs is a direct gap semiconductor with a room temperature band gap of 0.35 eV, which is the smallest of any III-V semiconductor other than InSb. The films were grown on an InAs substrate by metalorganic chemical vapor deposition.

In accordance with features of the invention, spectra from an InAs low band gap semiconductor film, which emits in the IR from 3000 to 3400 $cm^{-1}$ are presented in FIGS. 2-5. There is good agreement between the present results and previously published laser-excited spectra.

Figure 2:
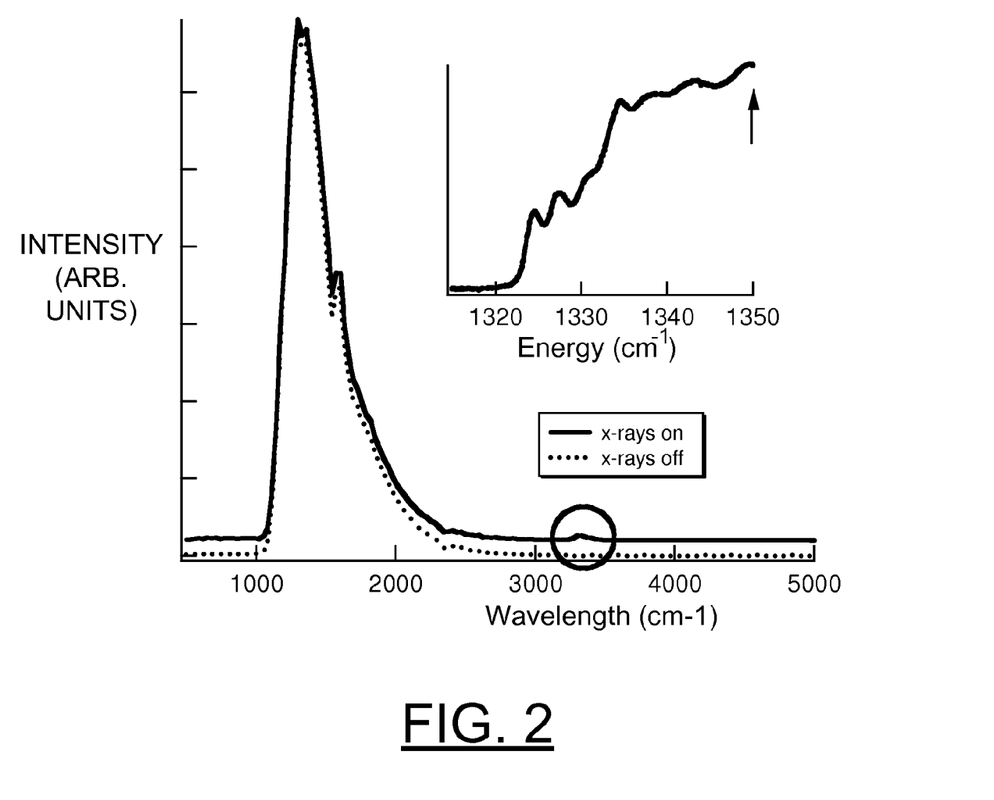
FIG. 2 illustrates a wide range FTIR spectrum obtained with X-ray irradiation and an inset shows the X-ray absorption spectrum of the InAs sample and the arrow indicates the energy (1350 eV) at which the data was obtained.

Referring to FIG. 2, FTIR spectra taken with and without irradiation by 1350 eV X-rays are displayed. This X-ray energy was chosen because it is near the peak of the beamline transmission and near the maximum of the As $L_{3,2}$ X-ray absorption coefficient, illustrated in the inset of FIG. 2. The measured sample current was 25 nA. The interferometer was operated at 40 kHz and 64 $cm^{-1}$ resolution; 3000 co-adds were performed to obtain the data.

Figure 3:
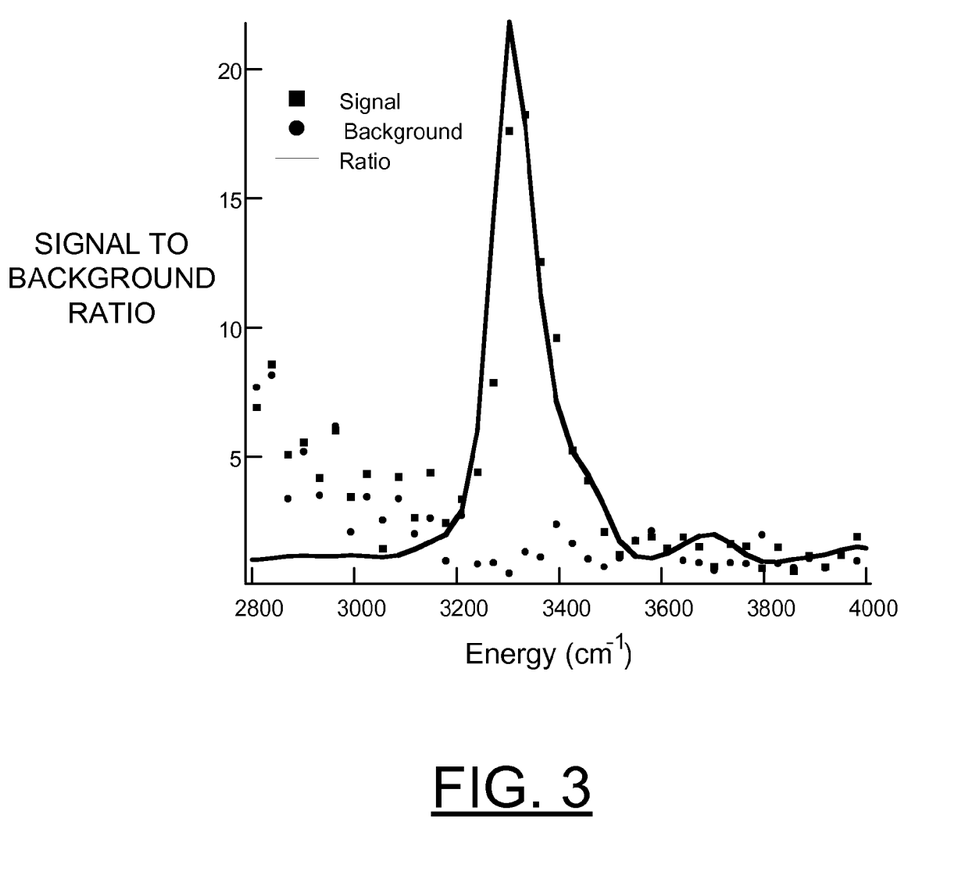
FIG. 3 illustrates a magnified view of the circled region in FIG. 2 showing the signal, background, and the signal to background ratio.

In FIG. 3, the overall FTIR spectrum of a sample cooled by liquid nitrogen to ~90 K is shown. The spectra are dominated by thermal blackbody background in the 1000-2000 $cm^{-1}$ range. The circled region in FIG. 2 shows the region where the bandgap excitation luminescence is expected; a small feature can be seen in the spectrum of the irradiated sample. This region is magnified and displayed in FIG. 3. Although the resolution is poor FIG. 3 demonstrates that even with a relatively weak monochromatic X-ray beam, FTIR spectra is obtained with the prototype apparatus 100.

By going close to the central image (CI) of the SGM monochromator it is possible to increase the X-ray intensity significantly. In this case the grating acts like a mirror so nearly all the X-rays are transmitted. Thus, it is possible to both increase the spectral resolution and decrease the acquisition time substantially.

Figure 4:
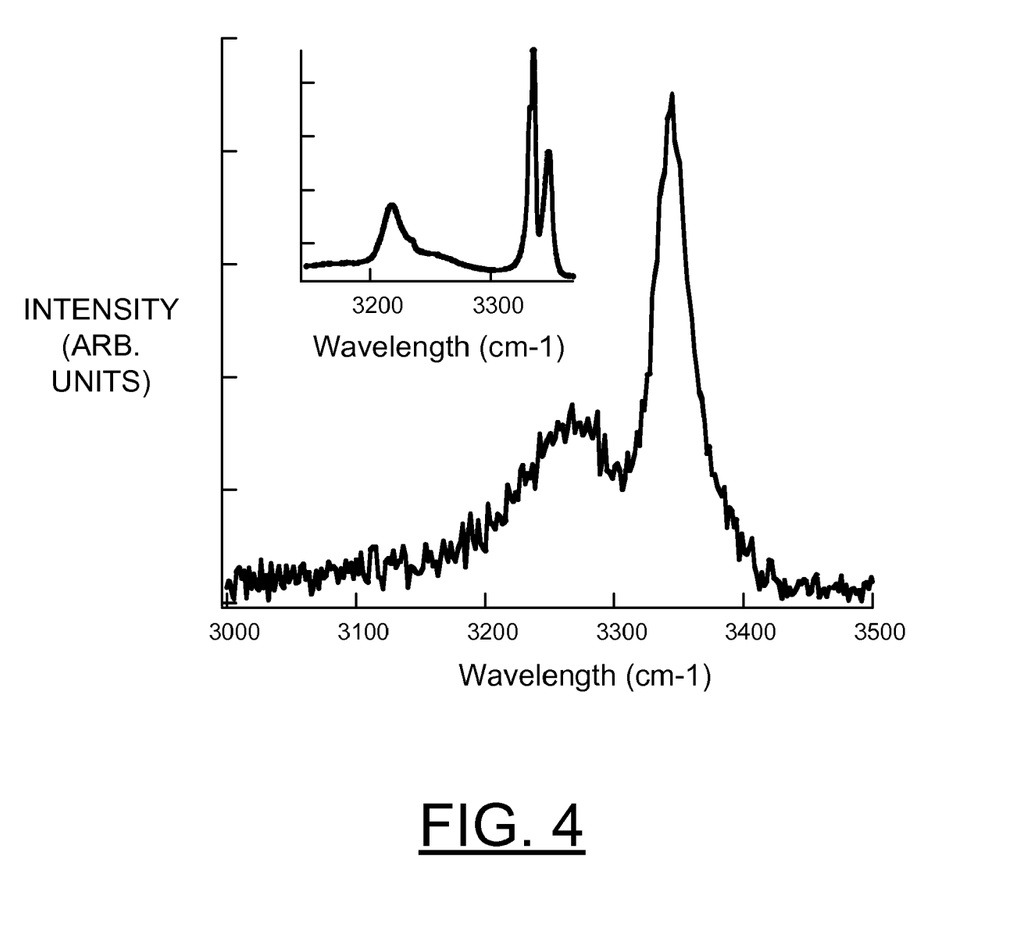
FIG. 4 illustrates high resolution FTIR spectrum obtained using central image (CI) X-rays and an inset shows the spectrum obtained using laser excitation.

FIG. 4 shows the FTIR spectrum of InAs, cooled to ~30 K, taken with the monochromator set near CI. These data were obtained with the spectrometer set to 4 $cm^{-1}$ resolution and 300 co-adds were used. The measured sample current was 180 nA, and the estimated incident power is 4 mW. The inset shows a high resolution (0.5 $cm^{-1}$) FTIR spectrum of a similar InAs sample, cooled to 1.4 K, obtained with 1 $mW/cm^2$ laser excitation using an excitation wavelength of 514.5 nm. All the main features of the laser-excited spectrum are visible in the X-ray excited spectrum. Differences between the spectra are presumably due to the lower resolution and higher temperature used to obtain the latter.

Figure 5:
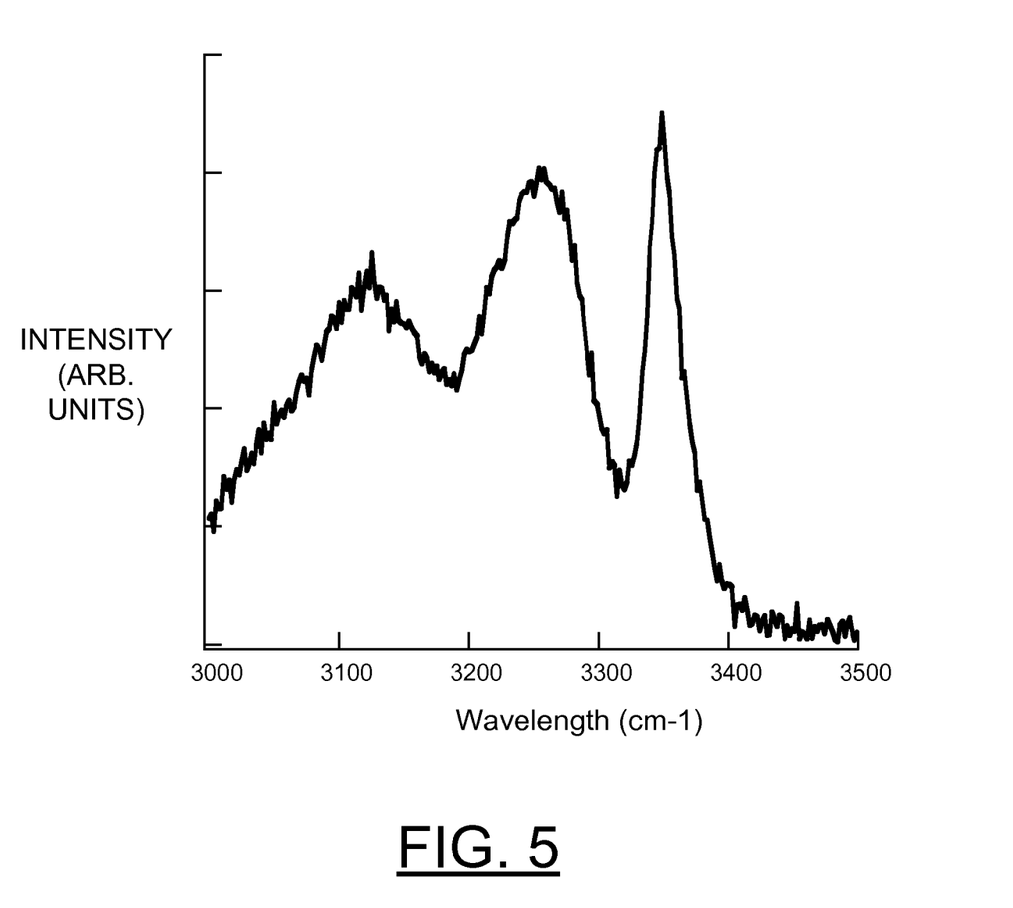
FIG. 5 illustrates high resolution FTIR spectrum obtained using 4 kV electrons.

Electrons were also used as an excitation source. FIG. 5 shows the FTIR emission spectrum of the InAs film, cooled to ~30 K, following excitation with a 4 kV electron beam. The two main features in the X-ray excited spectrum (FIG. 2) are also seen in the electron-excited data, but at different relative intensities. In addition a third feature at 3120 cm$^{-1}$ is seen in the electron-excited spectrum. We speculate that the main reason for the differences in FIGS. 4 and 5 is due to the large size of the electron beam used to obtain the latter data. The electron beam was larger than the InAs sample and thus sampled all regions of the sample, including the sides, which presumably have higher concentrations of defects. These inhomogeneities could account for the different relative intensities as well as the 3120 cm$^{-1}$ feature. However, these results indicate the promise of the technique for imaging by using a microscopic electron beam to locate the regions responsible for these differences.

X-rays and electrons can be focused to nanometer sizes and sub diffraction limited images could be obtained by rastering the beam or the sample and collecting the FTIR spectrum at each point. The ultimate spatial resolution will be limited by secondary excitations. For X-rays the effective mean radius of these excitations ranges from ~10 nm at 1000 eV to ~150 nm at 10,000 eV. For electrons the penetration range (in nm) can be calculated from the expression:

$$R_e = (27.6 \, A/\rho Z^{0.889}) E_b^{1.67}$$

where $R_e$ is the penetration length, A is the atomic weight, $\rho$ is the density, Z is the atomic number, and $E_b$ is the beam energy. Using this expression $R_e$ is calculated to be 470 nm for Si using a 5 kV electron beam.

The results shown in FIGS. 2 and 3, and FIGS. 4 and 5 demonstrate the viability of performing IR emission spectroscopy using X-ray and electron excitation. To bring this technique to its full potential will require significant advances. Major gains in signal to background could be achieved by the use of a dedicated, cooled system housing both the sample and spectrometer. Since SR is intrinsically pulsed and electron sources can be modulated or pulsed, use of time gating or lock-in techniques could further reduce the background. The use of higher energy X-ray or electron beams provides more localized power and thus enhances the signal. High energy X-rays also enable measurements to be performed at high pressures or in liquid or gaseous environments. In the future X-ray and electron induced infrared emission should become a valuable tool in a wide range of research fields.

While the present invention has been described with reference to the details of the embodiments of the invention shown in the drawing, these details are not intended to limit the scope of the invention as claimed in the appended claims.

What is claimed is:

1. An infrared (IR) emission spectroscopy and microscopy apparatus comprising:
    an X-ray beam source producing X-rays;
    a monochromator dispersing the X-rays,
    focusing optics focusing the X-rays to irradiate a sample;
    an electron beam source providing a small spot electron beam applied to the sample;
    a manipulator mounting and positioning the sample,
    a Fourier transform infrared (FTIR) system coupled to an objective lens collecting IR radiation;
    an IR radiation detector coupled to the FTIR system detecting IR radiation.

2. The infrared (IR) emission spectroscopy and microscopy apparatus as recited in claim 1 wherein said electron beam source includes an electron gun.

3. The infrared (IR) emission spectroscopy and microscopy apparatus as recited in claim 1 wherein said X-rays irradiating the sample provide a small spot X-ray beam applied to the sample.

4. The infrared (IR) emission spectroscopy and microscopy apparatus as recited in claim 1 wherein the sample is isolated from ground, enabling a sample current or total electron yield (TEY) to be monitored.

5. The infrared (IR) emission spectroscopy and microscopy apparatus as recited in claim 1 wherein said manipulator mounting and positioning the sample has heating and cooling capabilities, enabling temperature dependent studies.

6. The infrared (IR) emission spectroscopy and microscopy apparatus as recited in claim 1 includes a microchannel plate (MCP) detector to detect the total x-ray fluorescence (XRF).

7. The infrared (IR) emission spectroscopy and microscopy apparatus as recited in claim 1 wherein said X-rays irradiating the sample are on the order of approximately $10^{11}$ to $10^{15}$ photons/sec in the energy range of approximately 50-30000 eV.

8. The infrared (IR) emission spectroscopy and microscopy apparatus as recited in claim 1 wherein said objective lens collecting IR radiation includes a $CaF_2$ objective lens and said collected IR radiation transmitted through a $CaF_2$ viewport to the entrance of the interferometer.

9. The infrared (IR) emission spectroscopy and microscopy apparatus as recited in claim 1 wherein said IR radiation detector coupled to the FTIR system detecting IR radiation includes a liquid-nitrogen cooled, mercury-cadmium-telluride (MCT) detector.

10. The infrared (IR) emission spectroscopy and microscopy apparatus as recited in claim 1 wherein said monochromator dispersing the X-rays includes a spherical grating monochromator.

11. The infrared (IR) emission spectroscopy and microscopy apparatus as recited in claim 1 includes an electron beam source providing a small spot electron beam applied to the sample, and wherein images are obtained by scanning the electron beam, and simultaneously monitoring peak intensities from the corresponding FTIR spectra.

12. An infrared (IR) emission spectroscopy and microscopy apparatus comprising:
    an X-ray beam source producing X-rays;
    a monochromator dispersing the X-rays,
    focusing optics focusing the X-rays to irradiate a sample;
    a manipulator mounting and positioning the sample,
    a Fourier transform infrared (FTIR) system coupled to an objective lens collecting IR radiation;
    an IR radiation detector coupled to the FTIR system detecting IR radiation; and said Fourier transform infrared (FTIR) system includes a scanning electron microscope (SEM) system.

13. A process for implementing infrared (IR) emission spectroscopy and microscopy comprising the steps of:
    providing an X-ray beam source producing X-rays;
    focusing the X-rays to irradiate a sample;
    providing an electron excitation source producing an electron beam;
    scanning the sample with the electron beam;
    collecting IR radiation with an objective lens coupled to a Fourier transform infrared (FTIR) system; and detecting IR radiation with an IR radiation detector coupled to the FTIR system.

14. The process for implementing infrared (IR) emission spectroscopy and microscopy as recited in claim 13 includes providing a microchannel plate (MCP) detector to detect the total x-ray fluorescence (XRF).

15. The process for implementing infrared (IR) emission spectroscopy and microscopy as recited in claim 13 wherein detecting IR radiation with an IR radiation detector coupled to the FTIR system includes providing a liquid-nitrogen cooled, mercury-cadmium-telluride (MCT) detector.

16. The process for implementing infrared (IR) emission spectroscopy and microscopy as recited in claim 13 wherein focusing optics focusing the X-rays to irradiate a sample includes providing a monochromator dispersing the X-rays, and focusing optics focusing the X-rays to irradiate a sample.

17. The process for implementing infrared (IR) emission spectroscopy and microscopy as recited in claim 13 wherein scanning the sample with the electron beam includes providing a small spot focused electron beam; said small spot being less than 10 nm.

18. The process for implementing infrared (IR) emission spectroscopy and microscopy as recited in claim 13 wherein collecting IR radiation with an objective lens coupled to a Fourier transform infrared (FTIR) system includes providing a $CaF_2$ objective lens collecting IR radiation and said collected IR radiation transmitted through a $CaF_2$ viewport to the entrance of the interferometer.

19. The process for implementing infrared (IR) emission spectroscopy and microscopy as recited in claim 13 includes providing a manipulator mounting and positioning the sample, said manipulator having heating and cooling capabilities.

* * * * *